United States Patent [19]

Knowles

[11] 3,784,231
[45] Jan. 8, 1974

[54] TOW HITCH
[76] Inventor: Donald G. Knowles, 7471 N. Meadowpark Dr., Bedford, Ohio 44146
[22] Filed: June 21, 1972
[21] Appl. No.: 264,726

[52] U.S. Cl. ............................ 280/502, 242/100.1
[51] Int. Cl. .............................................. B60d 1/14
[58] Field of Search ...................... 280/502, 179 A; 242/100.1

[56] References Cited
UNITED STATES PATENTS

| | | | |
|---|---|---|---|
| 3,233,917 | 2/1966 | Lindsey | 280/502 |
| 3,667,780 | 6/1972 | Abromavage | 280/502 |
| 2,859,982 | 11/1958 | Covi | 280/502 |

Primary Examiner—Robert R. Song

[57] ABSTRACT

A tow hitch adapted to be releasably clamped to a vehicle bumper to effect a tow connection between two vehicles. The hitch includes a tow connection member, ball or socket, and at least one clamping mechanism for clamping the connection member to the bumper. Each clamping mechanism includes a pair of bumper clips adapted to be connected to spaced apart bumper edges. A cable interconnecting the clips is placed in tension by forces applied intermediate the length of the cable to force the frame of the tow hitch against the bumper.

9 Claims, 4 Drawing Figures

TOW HITCH

This invention relates to the art of tow hitches and, more particularly, to an improved tow hitch adapted to be secured to a vehicle bumper to effect a towing connection between two vehicles.

Whereas the invention will be described herein with particular reference to towing one vehicle by another, it is to be understood that the towed vehicle may be either a motorized vehicle or a non-motorized vehicle, such as a house trailer or the like.

A tow hitch, while applicable for towing non-motorized vehicles, is particularly applicable for use wherein one automobile serves to tow another automobile. For example, service stations, and the like, frequently use a small automobile in conjunction with pickup and delivery of a customer's automobile. A tow hitch is attached to the rear bumper of the customer's automobile and the tow hitch is then suitably fastened, as with a ball and socket arrangement, to a trailer hitch provided on the front bumper of a service automobile. The customer's automobile is then driven while towing the service automobile during the pick-up and delivery service.

It is desirable that such a tow hitch be constructed so that it may be quickly fastened and unfastened from a customer's automobile. Further, the hitch should be designed to accommodate bumpers of different designs. In addition, the tow hitch should be constructed to minimize damage to the customer's automobile bumper caused by scratching or marring the bumper surface, or by fastening forces which are applied in a manner to cause the bumper to buckle. While damage to the customer's bumper is to be prevented, the tow hitch must be of rugged construction, as it is frequently used, depending on the size of the service automobile to be towed.

It is, therefore, a primary object of the present invention to provide a tow hitch particularly applicable, although not limited in its application, to be fastened to the rear bumper of an automobile for purposes of towing another vehicle and constructed in such a manner as to be universally employable with bumpers of different design while minimizing damage to the bumper of the towing vehicle.

It is a still further object of the present invention to provide a tow hitch adapted to be fastened to the rear bumper of a motorized vehicle for towing a second vehicle with the fastening being accomplished in such a manner that the towing forces are relatively evenly distributed along the length of the bumper.

A still further object of the present invention is to provide a tow hitch which may be easily and rapidly secured to a vehicle bumper.

In accordance with one aspect of the present invention, the tow hitch includes a first tow connection fastening member, such as a ball, adapted to be fastened to a cooperating second tow connection fastening member, such as a socket, to effect a tow connection between two vehicles. At least one clamp mechanism serves to releasably clamp the first fastening member to a vehicle bumper. The clamp mechanism includes a rigid frame which carries, at essentially one end, a resilient bumper pad adapted to abut against the exposed surface of the bumper. A pair of bumper clips, interconnected by a cable, are hooked over spaced apart bumper edge portions. A cable tightening mechanism is securely mounted to the frame and includes a cable connector which is slidably connected to the cable at a location intermediate the cable ends, dividing the cable into two leg portions. Drive forces are applied to the cable connector so as to place the cable leg portions in tension tending to pull the frame and bumper toward each other and thereby clamp the tow hitch to the bumper.

In accordance with another aspect of the present invention, the cable connector is a rotatable shaft having an aperture extending therethrough in a direction transversely of its axis of rotation for slidably receiving the cable. As the shaft is rotated, the cable may initially slide through the aperture to equalize the tension in the two cable legs as they are wrapped about the shaft to increase the cable tension.

In accordance with a still further aspect of the present invention, a plurality of clamp mechanisms are provided for clamping the first tow connection member to the bumper with the clamping mechanisms providing clamping forces at spaced apart locations along the length of the bumper to thereby distribute the clamping and towing forces.

The foregoing and other objects and advantages of the invention will become more readily understood from the following description of the preferred embodiment of the invention taken in conjunction with the accompanying drawings, which are a part hereof, and wherein.

Figure 1:
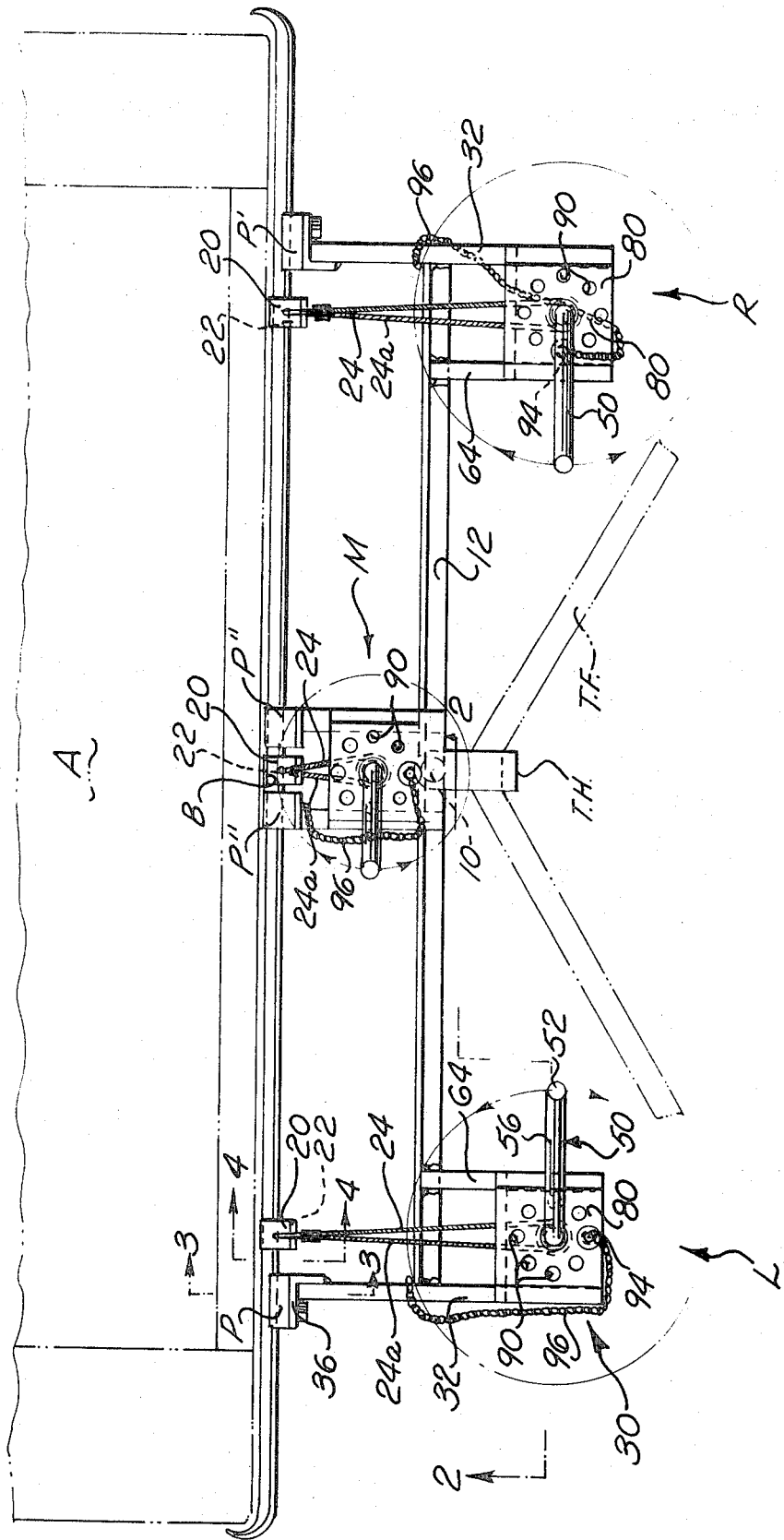
FIG. 1 is a plan view showing the tow hitch constructed in accordance with the present invention and having three spaced apart bumper clamp mechanisms.

Referring now to the drawings, wherein the showings are for purposes of illustrating a preferred embodiment of the invention only and not for purposes of limiting same, there is illustrated a tow hitch constructed in accordance with the present invention. The tow hitch is particularly applicable to be quickly clamped to the rear bumper B of an automobile A for towing another vehicle (not shown). The vehicle to be towed may be an automobile or a non-motorized vehicle. The tow hitch is particularly useful by service stations, or the like, for pickup and delivery of a customer's vehicle with the use of a smaller automobile or motorcycle. The vehicle to be towed may be provided with a trailer frame TF carrying a conventional trailer hitch TH so that connection may be made to the tow hitch through a conventional ball and socket arrangement.

The tow hitch is provided with one element of a ball and socket arrangement for connecting bumper B with trailer hitch TH. Preferably, although not necessarily, the element carried by the tow hitch takes the form of a conventional tow hitch ball 10 which is rigidly secured to a rigid frame member 12. Ball 10 is secured to frame member 12 as by welding at 14. Frame member 12 is of rigid construction, such as a two inch steel angle iron. Tow hitch ball 10 and its supporting frame member 12 are securely fastened to bumper B by a plurality of bumper clamp mechanisms including, as viewed in FIG. 1, a left clamp mechanism L and a right clamp mechanism R mounted at opposite ends of frame member 12, and a middle clamp mechanism M centrally located intermediate clamp mechanisms L and R. These clamp mechanisms are securely fastened to frame member 12, as by welding. The clamp mechanisms are similar in construction and, for purposes of simplifying the description herein, only clamp mechanism L will be described hereinafter in detail with the differences in the structure of mechanisms M and R being later described.

The left clamp mechanism includes a frame F which carries at one end thereof a resilient pad P adapted to resiliently abut against the exposed surface of bumper B. Frame F is securely tightened to bumper B by means of a pair of bumper clips 20 and 22 which are adapted to hook onto either the upper or lower bumper edge of bumper B, with the bumper clips being interconnected by a wire cable 24. Frame F is tightened against bumper B, through resilient pad P, by means of a cable tightening mechanism 30 carried by frame F at a point spaced substantially from pad P.

Figure 2:
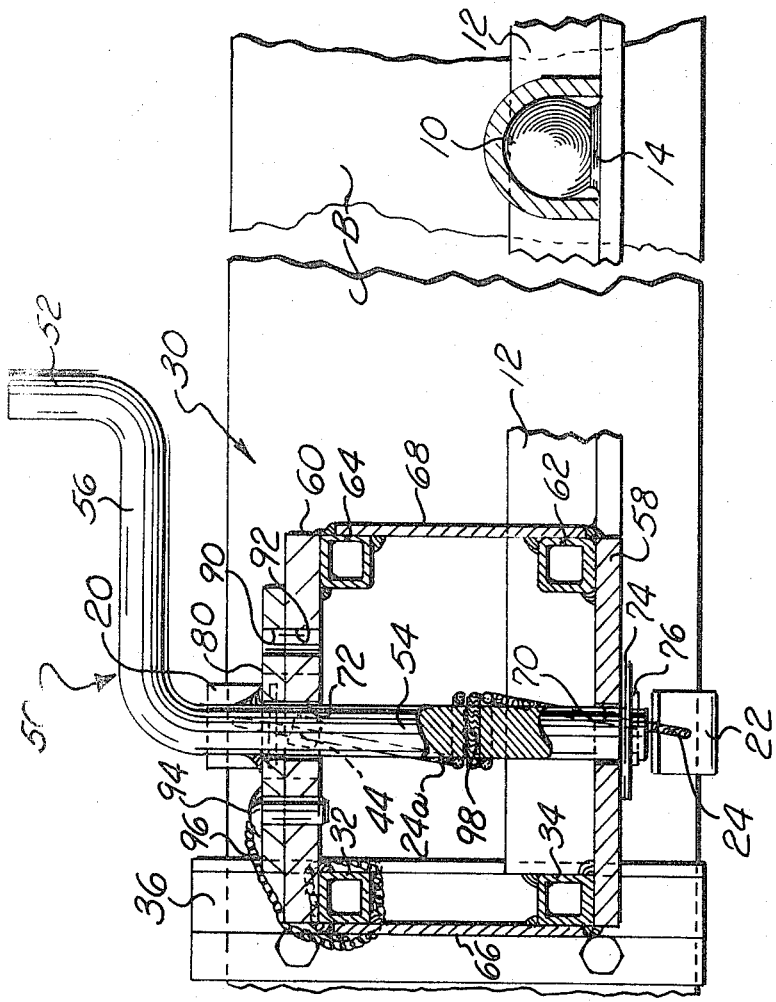
FIG. 2 is a sectional view taken along line 2—2 of FIG. 1 and looking in the direction of the arrows.

Frame F is preferably a rigid structure and, in the embodiment illustrated herein, includes a pair of frame members 32 and 34 (see FIG. 2). Members 32 and 34 are of rigid construction and, for example, may be constructed from a length of one inch square steel tubing. The two members 32 and 34 are spaced in parallel relationship and lie essentially in a vertical plane. At one end, where the two frame members face bumper B, they are secured to a curved backing plate 36, as by welding. Backing plate 36 is of rigid construction and may take the form of a length of curved two inch angle iron. The resilient pad P is preferably constructed from a rubber composition or plastic material exhibiting a degree of resiliency and is secured to backing plate 36 as by a suitable bond or by a nut and bolt arrangement. The backing plate 36 and resilient pad P are curved so as to generally conform with the curved surface of a typical automobile bumper.

Figure 4:
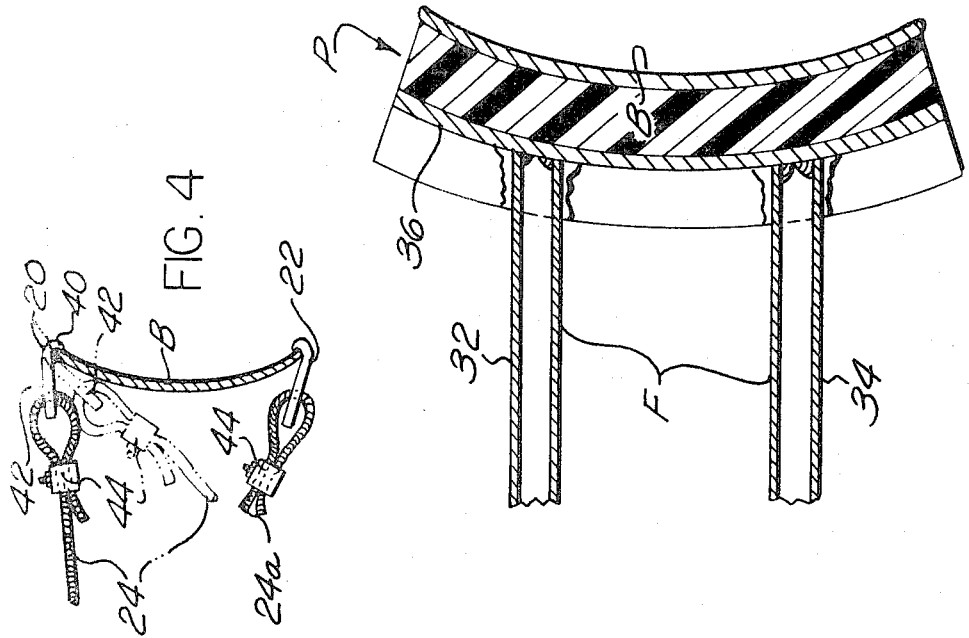
Figure 3:
FIG. 3 is a sectional view taken along line 3—3 in FIG. 1 and looking in the direction of the arrows; and, FIG. 4 is a sectional view taken along line 4—4 in FIG. 1 looking in the direction of the arrows.

Each of the bumper clips 20 and 22 takes the form as shown, with respect to bumper clip 20, in FIG. 4. Bumper clip 20 is constructed of relatively rigid material, such as steel, and is provided with a hook portion 40 at one end thereof so that the hook portion may be loosely hooked over the lip, or edge, portion of variously different styles of bumpers, such as bumper B shown in the drawings herein. Preferably, hook 40 permits a degree of pivotal movement of clip 20 about the bumper edge so that as tension is applied to cable 24 the bumper clip will pivot from the position as shown in phantom lines in FIG. 4 to the position as shown in solid lines. An aperture 42 is provided in the bumper clip at a point close to the end opposite from hook portion 40. Aperture 42 is of sufficient size that one end of cable 24 may extend through aperture 42 and then secured, as with a cable clamp 44, to an inwardly spaced portion of the cable.

The cable tightening mechanism 30 is secured to frame F and generally includes an S-shaped crank 50 having a crank handle 52 adapted to be grasped by the human hand and a crankshaft 54. Shaft 54 and handle 52 are interconnected by an intermediate portion 56. Shaft 54 is journalled by support plates 58 and 60 which are rigidly secured to frame F. Plates 58 and 60 are constructed of rigid material, such as steel plate, and are of rectangular configuraion. The two plates lie in parallel planes. The lower plate 58 is secured along one edge, as by welding to frame member 34. The opposite edge of plate 58 is secured, as by welding, to another frame member 62, constructed in the same manner as frame member 34 but of shorter length. Frame member 34 is secured, as by welding, to the transversely extending frame member 12. The upper plate 60 overlies and is in registry with lower plate 58 and is secured, as by welding, along one edge to the upper frame member 32. The opposite edge of plate 62 is secured, as by welding, to another frame member 64 which is of the same length as frame member 62. Frame members 62 and 64 are in parallel relationship and lie in a vertical plane. A side plate 66 of a length corresponding with that of plates 58 and 60 is welded to frame members 32 and 34. A similar side plate 68 is welded to frame members 62 and 64. The housing thus defined is closed at two sides by side plates 66 and 68 and is open on its opposite ends. The open end facing the bumper B is of sufficient size that no obstruction is placed in the way of cable 24, which, as will be described in greater detail hereinafter, is partially wrapped about shaft 54.

Plates 58 and 60 are respectively provided with enlarged apertures 70 and 72 aligned in registry. These apertures slidably receive shaft 54 with the enlarged size of the apertures providing bearing surfaces so that the shaft may be rotated about its axis of rotation. If desired a lubricant, such as grease, may be applied to the defined bearing surfaces. The lower end of shaft 54 protrudes beyond the lower surface of plate 58. An enlarged washer 74 is carried on the lower end of the shaft with the washer being held in place by a cotter pin 76 so that the shaft cannot be removed in a vertical direction from plates 58 and 60. A portion of shaft 54 protrudes beyond the upper surface of plate 60 before joining the intermediate portion 56. Between plate 60 and intermediate portion 56 the crankshaft carries a lock plate 80. Plate 80 is secured to shaft 54 as by welding and is positioned so that as the shaft rotates the lock plate rotates in a plane parallel to and spaced just slightly above the upper surface of plate 60.

Plates 60 and 80 are each provided with an annular array of circular apertures arranged coaxially about the axis of rotation of shaft 54. Apertures 90 in plate 80 and apertures 92 in plate 60 are preferably spaced so that, depending on the angle of rotation of shaft 54, the apertures 90 in plate 80 may be in registry with the apertures 92 in the stationary plate 60. With plate 80 so aligned it may then be locked in position by means of a lock pin 94 which, as shown in FIG. 2, is slidably received by a pair of aligned apertures 90 and 92. Lock pin 94 is preferably secured to frame F with a suitable chain 96 having one end connected to lock pin 94 and its opposite end secured, in any suitable manner, to the frame, such as to frame member 32. Shaft 54 has an aperture 98 extending radially through the shaft. Aperture 98 is oversized with respect to the diameter of cable 24 so as to permit the cable to be threaded through the aperture with a sliding fit.

With lock pin 94 removed from the apertures in plates 60 and 90, crank handle 92 may be driven, as by hand, to rotate shaft 54 about its axis of rotation in either the clockwise direction or in the counterclockwise direction, as illustrated by the arrows in FIG. 1, for tightening calable 24. As shaft 54 is being driven in the selected direction, cable 24 will first slide as needed through aperture 98 so that the tension exerted in the two cable legs 24a and 24b will equalize. The cable then wraps itself about shaft 54 until frame F is securely clamped against bumper B. Once the operator is satisfied that the clamping forces are sufficient, handle 52 may be slightly driven to further tighten or untighten the cable sufficient that apertures 92 and 90 in plates 60 and 80 are in alignment. Pin 94 is then positioned in place to prevent shaft 54 from rotating to decrease the tension on cable 24.

Bumper clamp mechanisms M and R are constructed in a manner substantially identical to that of clamp mechanism L and, consequently, only the differences in these two clamp mechanisms over mechanism L will be described hereinafter. Clamp mechanism R is a right handed version of clamp mechanism L, in that its shorter frame members which correspond with frame members 62 and 64 of mechanism L are on the left side, as viewed in FIG. 1, rather than on the right side. Similarly, the longer frame members of mechanism R which correspond with frame members 32 and 34 of mechanism L are located on the right, as viewed in FIG. 1, and these frame members carry on their forward edge a resilient pad assembly including a pad P' which serves to engage the exterior surface of bumper B.

Clamp mechanism M, unlike mechanisms L and R, is located between frame member 12 and bumper B. Its frame members which correspond with frame members 32, 34, 62 and 64, respectively, of mechanism L are all of the same length and are substantially shorter than those of mechanism L. Also, each of these frame members carries at its forward end a resilient pad P'' which corresponds to pad P of mechanism L. The opposite ends of the lower legs which correspond respectively with frame members 34 and 62 of mechanism L are secured, as by welding, to frame member 12. One additional difference between mechanism M and mechanism L is that the cable 24'' of mechanism M is substantially shorter than that of cable 24 of mechanism L due to its closer proximity to bumper B.

When securing the tow hitch to bumper B the resilient pads P, P' and P'' are placed against the exterior surface of the bumper so that pad P'' is located essentially at the middle of the bumper and pads P and P' are equally spaced on either side of pad P''. The bumper clips 20 and 22 for each clamp assembly are then clipped over the upper or lower edge of the bumper, with the bumper clips being spaced apart on the same bumper edge on opposite sides of the resilient pad, or, as shown in the drawings, the bumper clips for each assembly are hooked over opposite edges of the bumper. For example, bumper clips 20 and 22 of all clamp assemblies are respectively clipped over the upper edge and the lower edge of the bumper. Cable 24'' of the middle clamp mechanism M should be tightened first with the use of its cable tightening mechanism and then locked in place with the associated lock pin. Thereafter, clamp mechanism L is tightened and then clamp mechanism R is tightened. After all three clamp mechanisms have been tightened, the center or middle clamp mechanism should then be checked to see if it should be retightened.

Whereas the invention has been described in conjunction with a tow hitch employing three clamping mechanisms it is to be appreciated that in some applications, particularly for light pulling loads, only one clamp mechanism, such as mechanism M, may be employed. In other cases it may be desirable to provide only two clamp mechanisms, such as clamp mechanisms F and R, which may be spaced relatively closer or further apart than that indicated in FIG. 1. In addition, whereas the cable tightening mechanism has been described in conjunction with a lock plate and lock pin mechanism, other mechanisms may be employed, such as a ratchet wheel, having means to lock the wheel in position once the cables have been properly tightened.

Also, whereas the lock mechanism has been illustrated and described as including a pair of plates each having a plurality of apertures 90 and 92, it is to be understood that a different number of apertures may be provided in one plate from that in the other plate. For example, one of the plates may have a plurality of apertures and the other plate may have only one.

Whereas the invention has been described with respect to preferred embodiments, the above enumerated modifications and others may be made without departing from the spirit and scope of the present invention as defined by the appended claims.

What is claimed is:

1. A tow hitch adapted to be releasably clamped to a bumper on a vehicle, said tow hitch comprising a tow connection fastening member adapted to be fastened to a cooperating tow connection fastening member mounted to a second vehicle so that one of the vehicles may tow the other and at least one clamp mechanism for clamping said first fastening member to said bumper wherein said at least one clamp mechanism includes:

a rigid frame;

resilient bumper pad means carried by said frame at essentially one end thereof and adapted to abut against the exposed surface of said bumper;

first and second bumper edge clip means, each having a hook portion adapted to be loosely hooked about an edge portion of said bumper with said edge clips being hooked to spaced apart bumper edge portions;

a cable having its opposite ends respectively secured to said first and second edge clips; and cable tightening means securely mounted to said frame at a point spaced away from said bumper pad relative to said bumper, said tightening means including cable connecting means slidably connected to said cable intermediate its ends so as to define two slidably adjustable cable leg portions extending from said connecting means to said bumper edge clip means and drive means operative to apply force to said cable connecting means to effect initial slidable adjustment to said cable leg portions, and to apply force to said cable leg portions, whereby said cable leg portions are placed in equalized tension tending to pull said frame and bumper toward each other to compress said resilient pad means and thereby clamp said tow hitch to said bumper.

2. A tow hitch as set forth in claim 1 wherein said cable connecting means is mounted on said frame for rotation about an axis of rotation and comprises a rotatable shaft having an aperture extending therethrough substantially perpendicular to its axis of rotation, said cable being slidably threaded through said aperture, and said drive means including means for rotating said shaft about its axis of rotation so that as said shaft rotates the cable may initially slide through said aperture to equalize the tension in said two cable leg portions whereafter the leg portions are wrapped about said shaft to effect tightening of said tow hitch to said bumper.

3. A tow hitch as set forth in claim 2 wherein said means for rotating said shaft includes a handle member extending from said shaft and adapted to be manually driven for applying said rotational forces to said shaft so that said cable leg portions may be wound on said shaft when driven in either a clockwise direction or a counterclockwise direction.

4. A tow hitch as set forth in claim 2 including means for releasably locking said shaft in a desired position to prevent the shaft from rotating at least in a direction to permit said cable legs to be unwound therefrom.

5. A tow hitch as set forth in claim 4 wherein said releasably locking means includes a first plate member carried by said shaft and located in a plane extending essentially radially outward from said axis of rotation, a generally flat stationary plate member carried by said frame and aligned in close proximity to said first plate member, said two plate members lying generally in parallel planes, one of said plate members having a plurality of apertures extending therethrough in a direction generally parallel to said axis of rotation with said plurality of apertures being arranged in substantially an annular array coaxially about said axis of rotation, the other of said plate members having at least one aperture extending therethrough parallel to the axis of rotation and positioned so that in dependence upon the angular displacement of said rotatable plate member one of the apertures in one of said plates will be aligned with the aperture in the other of said plates, and a lock pin adapted to be inserted through said aligned apertures to lock said rotatable plates in place to prevent rotation of said shaft.

6. A tow hitch as set forth in claim 5 wherein each of said plate members has a plurality of said apertures arranged in an annular array coaxially about said axis of rotation so that in dependence upon the angle of rotation of said shaft all of said apertures in both plate members will be in alignment and said lock pin may be selectively placed in any aligned pair of apertures to lock said shaft in place.

7. A tow hitch as set forth in claim 1 including a plurality of said clamp mechanisms spaced apart from each other along said bumper, and means interconnecting said clamp mechanisms to define a unitary structure for securing said tow hitch connection fastening member to said bumper.

8. A tow hitch as set forth in claim 7 wherein said plurality of bumper clamp mechanisms includes at least first, second and third clamp mechanisms with said first clamp mechanism being located intermediate said second and third clamp mechanisms when clamped to said bumper.

9. A tow hitch as set forth in claim 8 wherein the cable tightening means of said first clamp mechanism is located forwardly of that for said second and third clamp mechanisms with respect to said bumper.

* * * * *